Patented Dec. 30, 1941

2,267,830

UNITED STATES PATENT OFFICE 2,267,830

RESIN COATING

Harry F. Lewis, Appleton, Wis., assignor to The Institute of Paper Chemistry, Appleton, Wis., a corporation of Wisconsin No Drawing. Application March 31, 1939, Serial No. 265,363

4 Claims. (Cl. 260—42)

This invention relates generally to resin coatings and more particularly to a resin coating for chemical laboratory furniture.

Laboratory table tops are subjected to destructive attack from almost every known source, chemical and physical. It is not only necessary that they withstand the action of innumerable chemicals but they must also withstand heat, abrasion, and shock.

Many different substances have been employed in the past, e. g. stone, sheet lead, ceramic ware, asbestos tops, and wood coated with some chemically resistant material. None of these has been completely satisfactory. Stone, the most commonly used, is attacked by strong alkaline and acid solutions. Where a material may resist acid and alkali, it will be injured by solvents such as furfural, phenol, carbon tetrachloride or gasoline.

It is, therefore, the object of this invention to provide a durable coating which will be inert to acids, alkalis and chemical solvents, and which will withstand the exposure to heat, abrasion, and shock resulting from ordinary usage.

I have discovered that a coating which will satisfy the stated requirements can be produced by mixing together a plurality of materials which, when so mixed, can be heated so as to result in a product which will have all the desirable properties.

For example, a solution of alcoholic and aldehydic derivatives of furane, when mixed with a solution of a co-polymer of vinyl halide and vinyl ester in acetone and a resinification promoter, can be heated to produce a coating of resin which is practically inert to all chemicals encountered in the ordinary laboratory.

The following is a description of a preferred method which I have used in preparing this new resin.

To a mixture containing 100 parts by weight of furfuraldehyde and 70 parts by weight of furfuralcohol there is added 68 parts by weight of a 15 percent acetone solution of the powdered co-polymer of vinyl acetate and vinyl chloride in which the chlorine content is about 45% of the total solids. This mixture is treated with 30 parts by weight of 6 percent $H_2SO_4$ in acetone to every 100 parts of the mixture. A resinification begins to set in.

To carry out the preferred method of application of the above prepared mixture, a dilution by 30–50 parts of acetone based on the total weight of the above mixture is immediately effected. The liquid is then sprayed on to the intended surface in a thin even coat. This is followed by a five minute drying period in an oven at 90°–100° C. A second coating is then immediately applied followed by another brief drying period. These two steps are repeated until a hard smooth coat of resin of the desired thickness is obtained which is then finally dried in an oven at 150° C. for 4 hours.

My new coating when tested with such representative chemicals as conc. HCl, conc. $HNO_3$, conc. $H_2SO_4$, 10% NaOH, pellet caustic, cuprammonia, ethanol, benzene, acetone, ether, carbon tetrachloride, and furfural, showed no effect whatsoever.

Under the shock test which consists in allowing a metal ball of known weight to drop by gravity from a known height on to a horizontal surface coated with the resin, the new resin withstands a four pound weight from one foot in contrast with the usual satisfactory requirement of two pounds from one foot. Concerning resistance to heat, the new resin has been found to be capable of withstanding 600° F. for 15 minutes without blistering.

Investigations into the variations of this preferred method have resulted in establishing certain limitations within which the best results are obtainable. For example, the limits of the ratio of furfuraldehyde to furfuralcohol are 1:1 and 3:1 respectively, and the percent of Vinylite co-polymer on the total furfural-furfuralcohol should range from 3% to 15%. By increasing the furfural-furfuralcohol ratio above 3:1 the resulting resin becomes less resistant to oxidizing agents and some solvents, and by decreasing the furfural-furfuralcohol ratio below 1:1 it was found that the new resin is more susceptible to the action of heat. By increasing the percent Vinylite co-polymer on the total furfural-furfuralcohol mixture above 15% a loss in resistance toward chemical solvents results and on decreasing it below 3% a loss in resistance toward acids results.

The amount of resinification promoter, when $H_2SO_4$, may vary from 0.3% to 2.0% on the total weight of alcohol, aldehyde, and Vinylite mixture. More than 2.0% will cause a jelling before spraying can be effected and less than 0.3% causes the resulting resin to be attacked, especially by concentrated nitric acid.

None of the above limits are intended to be sharp cut points beyond which a usable resin under certain conditions cannot be made, but are only indicative of the range giving the best results under the conditions stated.

The final polymerization of the active groupings in the coating takes place during the drying period. It, therefore, follows that many of the physical properties of the product depend on the temperature of drying and the time of exposure. The best results have been found when using the temperatures given in the preferred method, however, temperatures of 200° C. for short exposures will work as will many other similar combinations of time and temperature. The art of drying resins in general may be applied to this step in the process.

The resinification promoter is not limited to $H_2SO_4$ acid but may include other known mineral and organic acid, or acid salts which are familiar to the art. Many of the common plasticizers such as tricresyl phosphate, dibutyl phthalate, etc. may also be used in this process either alone or along with the catalyst. The powdered co-polymer of vinyl halide and vinyl ester may contain any ratio of the two components. The preferred co-polymer is commercially available at the present time and is well known to the art.

The term "vinylite" as used throughout this specification refers specifically to the powdered co-polymer of vinyl acetate and vinyl chloride in which the chlorine content is about 45%. However, it is intended that other co-polymers of vinyl halide and vinyl esters may be used.

It is realized that certain other modifications might occur to those skilled in the art. For example, the resinifying agent or catalyst may be added as a second step following the application of the acetone solution of furfuralcohol-furfuraldehyde Vinylite mixture. It is, therefore, desired that the following claims be given the broadest interpretation commensurate with the state of the art.

I claim:

1. A chemically inert resin composition prepared by heating a mixture containing furfural and furfuralcohol in a ratio within the limits of 1:1 to 3:1, a powdered co-polymer of vinyl chloride and vinyl acetate in which the chlorine content is about 45% in a quantity by weight of 3% to 15% of the furfural-furfuralcohol, and 0.3% to 2.0% $H_2SO_4$ by weight of the total mixture of vinyl compound and furfural compounds, said composition being particularly adaptable for use as coating material for chemical laboratory furniture.

2. A resin composition comprising the heat reaction product of a plurality of furane units consisting of furfuraldehyde and furfuralcohol and vinyl units consisting of vinyl chloride and vinyl acetate, the ratio of said aldehyde to said alcohol being 1:1 to 3:1 and the proportion of said vinyl units to said furane units being 3 to 15 per cent of said furane units.

3. A heat reactive composition particularly adaptable for coating chemical laboratory furniture comprising an acetone solution containing a mixture of about 100 parts of furfuraldehyde, about 70 parts of furfuralcohol, about 68 parts of a 15 per cent acetone solution of a co-polymer of vinyl acetate-vinyl chloride having a chlorine content of about 45 per cent, and about 30 parts of a 6 per cent acetone solution of sulfuric acid to every 100 parts of said mixture.

4. A process for producing a substantially chemically inert composition of improved resistance to heat, shock and abrasion, which comprises heating in the presence of an acid catalyst a mixture containing furane derivatives consisting of furfuraldehyde and furfuralcohol and a vinylite co-polymer consisting of vinyl chloride and vinyl acetate, the ratio of said aldehyde to said alcohol being 1:1 to 3:1 and the proportion of said vinylite co-polymer to said furane derivatives being about 3 to 15 per cent of said furane units.

HARRY F. LEWIS.